United States Patent [19]

Chu et al.

[11] Patent Number: 5,236,681
[45] Date of Patent: Aug. 17, 1993

[54] LAYERED SILICATE

[75] Inventors: Pochen Chu, Voorhees; Garry W. Kirker, Washington Township, Gloucester County, both of N.J.; Sowmithri Krishnamurthy, New York, N.Y.; James C. Vartuli, West Chester, Pa.

[73] Assignee: Mobil Oil Corp., Fairfax, Va.

[21] Appl. No.: 443,692

[22] Filed: Nov. 30, 1989

[51] Int. Cl.$^5$ ............................................. C01B 33/32
[52] U.S. Cl. .................................... 423/333; 423/332; 423/277
[58] Field of Search ............... 423/326, 332, 333, 334, 423/328.2, 277

[56] References Cited

U.S. PATENT DOCUMENTS

| | | | |
|---|---|---|---|
| 2,496,736 | 10/1942 | Maloney | 423/339 |
| 4,578,258 | 3/1986 | Rieck | 423/333 |
| 4,626,421 | 12/1986 | Zones | 423/326 |
| 4,806,327 | 2/1989 | Rieck et al. | 423/332 |
| 4,859,648 | 8/1989 | Landis et al. | 502/242 |

FOREIGN PATENT DOCUMENTS 0202797 11/1986 European Pat. Off. .
0205711 12/1986 European Pat. Off. .

*Primary Examiner*—Michael Lewis
*Assistant Examiner*—Stuart L. Hendrickson
*Attorney, Agent, or Firm*—Alexander J. McKillop; Dennis P. Santini; Edward F. Kenehan, Jr.

[57] ABSTRACT

There is provided a method for synthesizing layered silicates such as magadiite and kenyaite. The source of silica used in this method is freshly precipitated from a silicate solution. For example, this silica source may be obtained by treating an aqueous solution of sodium silicate with sulfuric acid to form an amorphous silica precipitate. This silica precipitate is not dried to reduce its activity prior to use.

7 Claims, No Drawings

LAYERED SILICATE

BACKGROUND

This application relates to a process for preparing a layered silicate from a reactive form of silica which has been freshly prepared from a solution of a silicate.

Published European Patent Application No. 202,797, the entire disclosure of which is expressly incorporated herein by reference, describes a particular method for the preparation of zeolites such as ZSM-5. According to this method, silica, which has been freshly prepared from a solution of a silicate, is used in the reaction mixture.

Layered silicates such as magadiite are layered materials which have structures distinct from zeolite structures such as that of ZSM-5. Layered materials have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

The Zones U.S. Pat. No. 4,626,421, the entire disclosure of which is expressly incorporated herein by reference, describes the preparation of magadiite from reaction mixtures containing hydrocarbon substituted ureas or amides. It is pointed out that magadiite is useful as a source of silica for preparation zeolites. In Example 1 of this Zones patent, a sodium silicate solution is used as the source of silica for preparing magadiite. It is stated that there is no gelatin or precipitation of the reaction mixture prior to loading it into the crystallization reactor.

Published European Patent Application No. 205,711 points out that layered oxide materials including layered silicates, such as magadiite and kenyaite, may be intercalated with polymeric oxides to provide catalysts suitable for various hydrocarbon conversions.

SUMMARY

According to an aspect of this invention, there is provided a process for preparing a layered silicate, said process comprising the steps of:
(i) contacting an aqueous solution of a silicate with a precipitating reagent to form a fully hydrated insoluble silica precipitate; and
(ii) introducing said fully hydrated silica precipitate of step (i) into a reaction mixture containing water and an alkali metal hydroxide under conditions sufficient to convert said silica into said layered silicate.

It will be understood that the terms, magadiite and kenyaite, as used herein, connote synthetic forms of the naturally occurring substances of the same structure. For example, naturally occurring magadiite has been found in Lake Magadi, Kenya. The expression, fully hydrated silica precipitate, as used herein, connotes highly reactive forms of silica which are distinguished from less reactive forms of precipitated silica, such as commercially available precipitated silicas which have been dehydrated, at least partially, to reduce shipping weight and to improve handleability, especially flowability. The expression, fully hydrated silica precipitate, is discussed further hereinafter.

EMBODIMENTS

Layered silicates are composed of tetrahedral sheets condensed on each other and lack the octahedral sheets found in clays. Layered silicates are "non-swellable" which is intended to distinguish from conventional clays which contain octahedrally coordinated metal oxide sheets bonded to tetrahedrally coordinated silica sheets and which undergo substantial swelling, sometimes by an essentially unbounded amount, when contacted with water. As used herein in relation to a layered silicate material, the term "non-swellable" is defined as meaning a layered silicate material, which, when contacted with at least 10 grams of water per gram of the layered silicate at 23° C. for 24 hours, exhibits an increase in d-spacing no greater than 5A as compared with the material before treatment. Included among these materials are the metasilicates. Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms.

The layered silicates known as high silica alkali silicates whose layers lack octahedral sheets can be prepared hydrothermally from an aqueous reaction mixture containing silica and caustic at relatively moderate temperatures and pressures. These layered silicates may contain tetracoordinate framework atoms other than Si.

Such layered silicates can be prepared by co-crystallizing in the presence of non-silicon tetravalent elements, e.g., those selected from the group consisting of Al, B, Cr, Fe, Ga, In, Ni, Zr as well as any other such elements which are catalytically useful when incorporated in the silicate structure. Alternatively, non-silicon framework elements already in a layered silicate may be substituted by a tetracoordinate element. For example, kenyaite containing boron in its framework when treated with aluminum nitrate results in a kenyaite which contains aluminum in its framework. Both co-crystallized and substituted layered high silica alkali silicates may be methods described herein.

Synthetic magadiite is readily synthesized hydrothermally from a reaction mixture containing inexpensive sources of silica and caustic. Tetracoordinate elements other than silicon, e.g., those selected from the group consisting of Al, B, Cr, Fe, Ga, In, Ni, Zr and other catalytically useful metals, may be added to the reaction mixture to produce synthetic magadiite layered silicates. Preferably, such elements are selected from the group consisting of Al and Fe. An organic directing agent may also be added to the reaction mixture. The reaction mixture for synthetic magadiite materials can be described in molar ratios as follows:

| | |
|---|---|
| $SiO_2/X_2O_3$ = | 10 to infinity where X can be Al, B, Cr, Fe, Ga, and/or Ni or other catalytically useful metal |
| $M^+OH^-/SiO_2$ = | 0 to 0.6 (preferably 0.1–0.6) M = any alkali metal |
| $H_2O/SiO_2$ = | 8–500 |
| $R/SiO_2$ = | 0–0.4 | where R can be an organic such as benzyltriethylammonium chloride, benzyltrimethylammonium chloride, dibenzylmethylammonium chloride, N,N'-dimethylpiperazine, triethylamine, or other quaternary compounds or heterocyclic amines.

The reaction mixture can be maintained at a temperature of about 100° to 200° C. for anywhere from about 1 to about 150 days in order to form a product having the following composition:

| | |
|---|---|
| % N = | 0–3, e.g., 0 to 0.3 |
| $SiO_2/X_2O_3$ = | 10 to infinity where X may be in the tetrahedral or octahedral position |
| $M_2O/SiO_2$ = | 0 to 0.5, e.g., 0.05–0.1 |

Kenyaite, a layered silicic acid which is known to exist in nature as a sodium salt $Na_2Si_{22}O_{45}\cdot H_2O$ can be prepared in the potassium form $K_2Si_{22}O_{45}\cdot 10H_2O$ in the laboratory. Synthetic kenyaite is readily synthesized hydrothermally from a reaction mixture containing inexpensive sources of silica and caustic, preferably KOH. Tetracoordinate elements other than silicon, e.g., those selected from the group consisting of Al, B, Cr, Fe, Ga, In, Ni, Zr and other catalytically useful metals, may be added to the reaction mixture to produce synthetic kenyaite. $Al(NO_3)_3\cdot 9H_2O$ and aluminum-tri-sec-butoxide are suitable reagents for the introduction of non-silicon tetracoordinate elements in the kenyaite framework. Co-crystallizing with B, Al, and/or Zr is particularly preferred. The reaction mixture may also be seeded with kenyaite.

The silica source for the reaction mixture is an amorphous silica precipitate made from aqueous solution of a soluble silicate. Conveniently, the solution has a pH ranging from 9 to 12. An example of the soluble silicate is sodium silicate. The silica precipitate may be formed by its continuous precipitation from the solution phase. Accordingly, precipitation comprises initiating precipitation and maintaining said precipitation.

Alteration of the composition of the solution of soluble silicate is undertaken by introducing a precipitating reagent. In one embodiment, the precipitating reagent is a source of acid. Thus, the precipitating reagent can be an acid solution. The acid of the solution may be any mineral acid, such as $H_2SO_4$, HCl, $HNO_3$, etc., and can have a pH ranging from essentially 0 to about 6. Thus, precipitation of the silica precipitate can be effected by acid neutralization of a basic solution of a silicate.

The silica can be precipitated alone in the absence of sources of other layered silicate framework elements, e.g. aluminum. In this fashion, both the precipitating reagent and the solution of silica source can be free of intentionally added alumina or alumina source. That is, no aluminum is deliberately added to the silica precipitation reaction mixture, in this embodiment; however, aluminum is ubiquitous and the presence of such a material in minor amounts is due to impurities in the precursors of the reactants or impurities extracted from the reaction vessel. When no source of alumina is added, the amount of alumina in the silica precipitate will be less than about 0.5 weight percent, and generally less than 0.2 weight percent. When a source of alumina is added, the amount of alumina in the silica precipitate may be up to about 5 wt. %. Silicate precipitation can be coprecipitation in the presence of soluble sources of other layered silicate framework elements including aluminum, gallium, indium, boron, iron and chromium. The soluble source of these other layered silicate framework components can be, for example, nitrates. The coprecipitation product would be amorphous, for example an amorphous silica-alumina, silica-boria or silica-gallia.

Continuous precipitation of the amorphous silica precipitates may comprise introducing the solution of silicate and the precipitating reagent to a reaction zone while maintaining a molar ratio of silicate to precipitating reagent substantially constant. For example, the precipitating reagent and silicate may be introduced simultaneously into the reaction zone. The continuous precipitation of silica effects two results. Firstly, silica gel formation is at least substantially eliminated and secondly, precipitated silica particle size exceeds that silica particle size at which silica gel formation is possible. The precipitated silica comprises agglomerated solids in the shape of microspheres. Due to the specific water coordination of these particles, suspensions of these particles exhibit low viscosities at high solids loading in the subsequent layered silicate synthesis reaction mixture of the present invention, even at solids loading equal to or greater than about 10–40% e.g., greater than 20 percent by weight. The particle size of the precipitated silica may range between 1–500 microns, but the average size is 50–100 microns.

Other conditions affecting precipitation of silica include time, pH and temperature. The temperature of the precipitation mixture can range from 80° F. to 300° F. (about 27° C. to 150° C.). The time of contact of the solution of silicate and the precipitating reagent can range from about 10 minutes to several hours at pH maintained from about 6 to 11. Generally, the silica precipitate is processed by isolating it, for example by filtration, and removing soluble contaminants therefrom by washing and/or ion exchange. This stage can be considered a solids consolidation step.

The washed silica precipitate may be incorporated into the reaction mixture as a wet, moist or partially dry solid. The precipitated silica may be subjected to drying conditions sufficient to remove water physically associated therewith. However, the drying conditions should not be so severe as to remove a substantial amount of chemically bound water, especially in the form of silanol groups which tend to liberate water by condensation reactions when the silica is heated to temperatures of over 100° C. for a sufficient length of time. Accordingly, it is preferred that the washed silica precipitate is not subjected to temperatures of greater than 100° C. for a sufficient length of time.

It has been discovered that choice of the present precipitated silica as a silica source in the preparation of kenyaite results in the shortening of time needed to complete crystallization of the reaction mixture. Without being bound by any theory, it is theorized that this reduced crystallization time is attributable, at least in part, to reactive silanol groups on the surface of the precipitated silica.

Unlike commercially available sources of precipitated silica, there is no need to reduce the shipping weight or flowability of the particulate solids of the present fully hydrated precipitated silica. Accordingly, the present fully hydrated precipitated silica is sufficiently hydrated to enable the formation of large masses of spherical agglomerates, which retain their shape upon manual compaction, much like snowballs formed from wet snow. By way of contrast, commercially available precipitated silicas are dehydrated sufficiently to become light, flowable and pourable. The particles of such commercially available silicas will not stick together upon manual compaction.

The present fully hydrated precipitated silicas are more reactive than commercially available precipitated silicas, insofar as the present precipitated silicas will produce layered silicates in short periods of time. It has been discovered that the reactivity of commercially available precipitated silicas can be improved by rehydrating these silicas under sufficient aqueous conditions. However, this rehydration procedure is quite time consuming and provides a less desirable route to hydrated silica than the present direct precipitation method.

When the present precipitated silica is used in a reaction mixture, the reaction mixture has desirable rheological properties even at high solids content. More particularly, such high solids content reaction mixtures can be readily stirred even under crystallization conditions. By way of contrast gelled systems of comparable high solids content tend to be extremely stiff and difficult, if not practically impossible, to stir.

The precipitated form of silica used in the foregoing Examples is referred to herein as "silica precursor". It will be apparent that this silica precursor is different from the Ultrasil precipitated silica used in the Comparative Example.

Preparation of the Silica Precursor

The silica precipitate precursor for the present Examples was produced using the formulations given in Table 1 as follows:

TABLE 1

| Precursor Synthesis | |
|---|---|
| Solutions | Volume Basis |
| Silicate Solution | |
| Sodium Silicate | 100 |
| (Q-Brand 29 wt % $SiO_2$, 9 wt % $Na_2O$) | |
| 50 wt % NaOH | 1.03 |
| $H_2O$ (Demineralized | 98.9 |
| Acid Solution | |
| 24 wt % $H_2SO_4$ | 67.0 |

The precursor is prepared in a continuous manner by neutralizing a sodium silicate solution under carefully controlled conditions. The resulting product is a suspension of agglomerated solids in the shape of microspheres. Because of the size and shape, and because primary agglomeration has already taken place, suspensions of these particles exhibit low viscosities at high solids loadings (30 wt %). This is in marked contrast to an equivalent, non-controlled neutralization which results in solid, non-stirrable mass. The particle size of the precursor ranges between 1–500 micron but the average size is 70 microns.

The two solutions were reacted continuously at 30 min. residence time in a plastic vessel equipped with an overflow and mixer. The vessel was filled with water. The silicate solution and the acid solution are pumped into the vessel in a continuous manner. The pH was controlled to about 8. The average residence time of the product is 30 minutes, and it is discharged continuously from the vessel by an overflow tube. The product was collected, filtered and washed with demineralized water to be sulfate free. Analysis of the washed silica precursor is set forth below in Table 2.

TABLE 2

| Analysis of Washed Precursor | |
|---|---|
|  | Wt. Percent |
| Sulfur | 0.005% |
| Silica | 91.3% |
| Alumina | 0.1% |
| Sodium | 1.5% |
| Ash at 1000° F. (542° C.) | 95.53% |

EXAMPLE 1

Pure magadiite was synthesized at 300° F. (149° C.), 14 weight percent solids loading and an $OH^-/SiO_2$ molar ratio of about 0.2. The crystallization took place for about 88 hours. Parameters of this synthesis are summarized in Table 1.

TABLE 1

| Synthesis of Magadiite | | | | | |
|---|---|---|---|---|---|
| NaOH Mols | $SiO_2$ Mols | $H_2O$ Mols | Time Hrs. | Temp °F. | Solids % |
| 0.34 | 1.02 | 35.7 | 88 | 300 | 14 |

EXAMPLE 2

The synthesis of this Example is similar to the synthesis of Example 1 except that the solids loading of the reaction mixture was raised to about 30 weight percent. The product of this synthesis was magadiite with a quartz impurity. Parameters of this synthesis are summarized in Table 2.

TABLE 2

| Synthesis of Magadiite | | | | | |
|---|---|---|---|---|---|
| NaOH Mols | $SiO_2$ Mols | $H_2O$ Mols | Time Hrs. | Temp °F. | Solids % |
| 0.71 | 3.2 | 25.0 | 88 | 300 | 30 |

COMPARATIVE EXAMPLE

Water, Ultrasil (a commercially available, dried, precipitated silica), and potassium hydroxide were combined in the following ratios:

| $OH/SiO_2$ | 0.21 |
|---|---|
| $H_2O/SiO_2$ | 17.8 |

The mixture was placed in a stainless steel autoclave and heated to 300° F. The synthesis mixture was continuously agitated. Samples of the synthesis mixture were taken at both 72 hours and 86 hours on stream. After 72 hours the synthesis mixture showed signs of the crystalline material kenyaite but was not fully crystallized until after 86 hours on stream. The sample obtained after 86 hours indicated (from XRD pattern) that kenyaite was formed.

EXAMPLE 3

Water, silica precursor and potassium hydroxide were combined in the following ratios:

| | |
|---|---|
| OH/SiO$_2$ | 0.21 |
| H$_2$O/SiO$_2$ | 17.6 |

The mixture was placed in a stainless steel autoclave and heated at 300° F. The synthesis mixture was continuously agitated. After 48 hours the XRD pattern of the synthesis mixture showed fully crystallized kenyaite.

A comparison of the results shown for the Comparative Example with the results shown for Example 3 demonstrates that kenyaite can be synthesized in shorter times with the use of the silica source of the present invention.

EXAMPLE 4

Water, silica precursor and potassium hydroxide were combined in the following ratios:

| | |
|---|---|
| OH/SiO$_2$ | 0.10 |
| H$_2$O/SiO$_2$ | 7.1 |

The mixture was placed in a stainless steel autoclave and heated to 300° F. The synthesis mixture was continuously agitated. After 72 hours the XRD pattern of the synthesis mixture showed traves of kenyaite but was not fully crystallized.

EXAMPLE 5

Water, silica precursor and potassium hydroxide were combined in the following ratios:

| | |
|---|---|
| OH/SiO$_2$ | 0.21 |
| H$_2$O/SiO$_2$ | 6.9 |

The mixture was placed in a stainless steel autoclave and heated to 300° F. The synthesis mixture was continuously agitated. After 48 hours the XRD pattern of the synthesis mixture showed fully crystallized kenyaite.

What is claimed is:

1. A process for preparing kenyaite, said process comprising the steps of:
   (i) contacting an aqueous solution of sodium silicate with a source of acid to form a fully hydrated, insoluble silica precipitate;
   (ii) introducing said fully hydrated silica precipitate of step (i) into a reaction mixture containing water and an alkali metal hydroxide under conditions sufficient to convert said silica into said kenyaite; and
   (iii) recovering said kenyaite,
wherein prior to step (ii), said silica precipitate of step (i) is separated from water by filtration and washed with water to remove sodium ions, whereby said precipitate is not subjected to temperatures of greater than 100° C. prior to being introduced into said reaction mixture as per step (ii).

2. A process according to claim 1, wherein said reaction mixture further contains a source of an oxide designated by the formula X$_2$O$_3$, where X is Al, B, Cr, Fe, Ga or Ni, said reaction mixture having a molar ratio of SiO$_2$ to X$_2$O$_3$ of at least 10.

3. A process according to claim 1, wherein said acid is H$_2$SO$_4$.

4. A process according to claim 1, wherein the solids content of said reaction mixture is at least 20 percent by weight.

5. A process according to claim 1, wherein said reaction mixture does not contain an organic directing agent.

6. A process according to claim 1, wherein said silica precipitate is introduced into the reaction mixture of step (ii) as a wet cake material.

7. A process according to claim 1, wherein said silica precipitate of step (i) has an average particle size of from 50–100 microns.

* * * * *